United States Patent [19]

Lovely et al.

[11] 3,755,619

[45] Aug. 28, 1973

[54] AUTOMATIC COLOR SATURATION CONTROL RESPONSIVE TO AMBIENT LIGHT LEVEL

[75] Inventors: John D. Lovely, Waterloo; Sam Q. Wong, Kitchener, Ontario, both of Canada

[73] Assignee: Electrohome Limited, Ontario, Canada

[22] Filed: June 9, 1972

[21] Appl. No.: 261,229

[52] U.S. Cl. .......................................... 178/5.4 AC

[51] Int. Cl. .......................................... H04n 9/48

[58] Field of Search .................. 178/5.4 R, 5.4 AC, 178/7.3 DC, 7.5 DC, 5.4 BT

[56] References Cited

UNITED STATES PATENTS

| | | | |
|---|---|---|---|
| 3,315,029 | 4/1967 | Suhrmann | 178/7.5 DC X |
| 3,649,755 | 3/1972 | Newman | 178/7.5 DC |

*Primary Examiner*—Robert L. Richardson
*Attorney*—Peter W. McBurney et al.

[57] ABSTRACT

An automatic saturation control system includes an A.G.C. system for the chrominance signal that maintains an essentially constant saturation level. This level is varied automatically by a device such as a light dependent resistor in response to changes in light incident on the light dependent resistor, the latter being mounted to receive ambient light on the picture tube screen and/or light emitted from the picture tube screen.

10 Claims, 3 Drawing Figures

AUTOMATIC COLOR SATURATION CONTROL RESPONSIVE TO AMBIENT LIGHT LEVEL

BACKGROUND OF THE INVENTION

This invention relates to automatic saturation control systems for colour television receivers. More particularly, this invention relates to an automatic saturation control system that is responsive to changes in the light incident on the picture tube of the receiver in which the system is incorporated and/or changes in the average light output of the picture tube to change colour saturation automatically and in proportion to the light change.

It is well known that if a television receiver is properly set up in a darkened room to reproduce a colour picture and the screen of the picture tube of that receiver then is flooded with sunlight, a marked deterioration in the quality of the reproduced picture will result. The picture will appear "washed out". In other words, the colour will fade, reds becoming pinks etc. The same effect will be observed if the brightness level of the luminance signal relative to the level of the chrominance signal becomes to high. What is required to prevent or minimize deterioration of the quality of the reproduced picture under the foregoing circumstances is automatic control of colour saturation.

Automatic saturation control systems that sense the levels of the luminance and chrominance signals received by a receiver and operate to maintain a constant ratio of luminance to chrominance signal level are known. Such system are relatively expensive, however, and also suffer from the disadvantage that they are unable to compensate for changes in ambient light conditions, since changes in the light incident on the picture tube of a television receiver do not affect either the luminance or chrominance signals received by the receiver.

SUMMARY OF THE INVENTION

In accordance with this invention there are provided automatic saturation control systems that automatically control colour saturation with changes in ambient light incident on and/or average light emitted by the screen of a picture tube of a colour television receiver.

An automatic saturation control system embodying this invention includes an A.G.C. system in the chrominance signal channel of the receiver ahead of the demodulators. The A.G.C. system maintains an essentially constant saturation level. A device such as a light dependent resistor which is sensitive to radiation (light waves) and which changes a characteristic (resistance) thereof in responsive to the amount of light incident thereon is mounted to receive ambient light incident on the picture tube and/or light emitted from the picture tube and, by varying the threshold level of a component in the A.G.C. system, automatically controls the saturation level to which the A.G.C. system regulates.

BRIEF DESCRIPTION OF THE DRAWINGS

This invention will become more apparent from the following detailed description, taken in conjunction with the appended drawings, in which.

DESCRIPTION OF PREFERRED EMBODIMENTS

Figure 1:
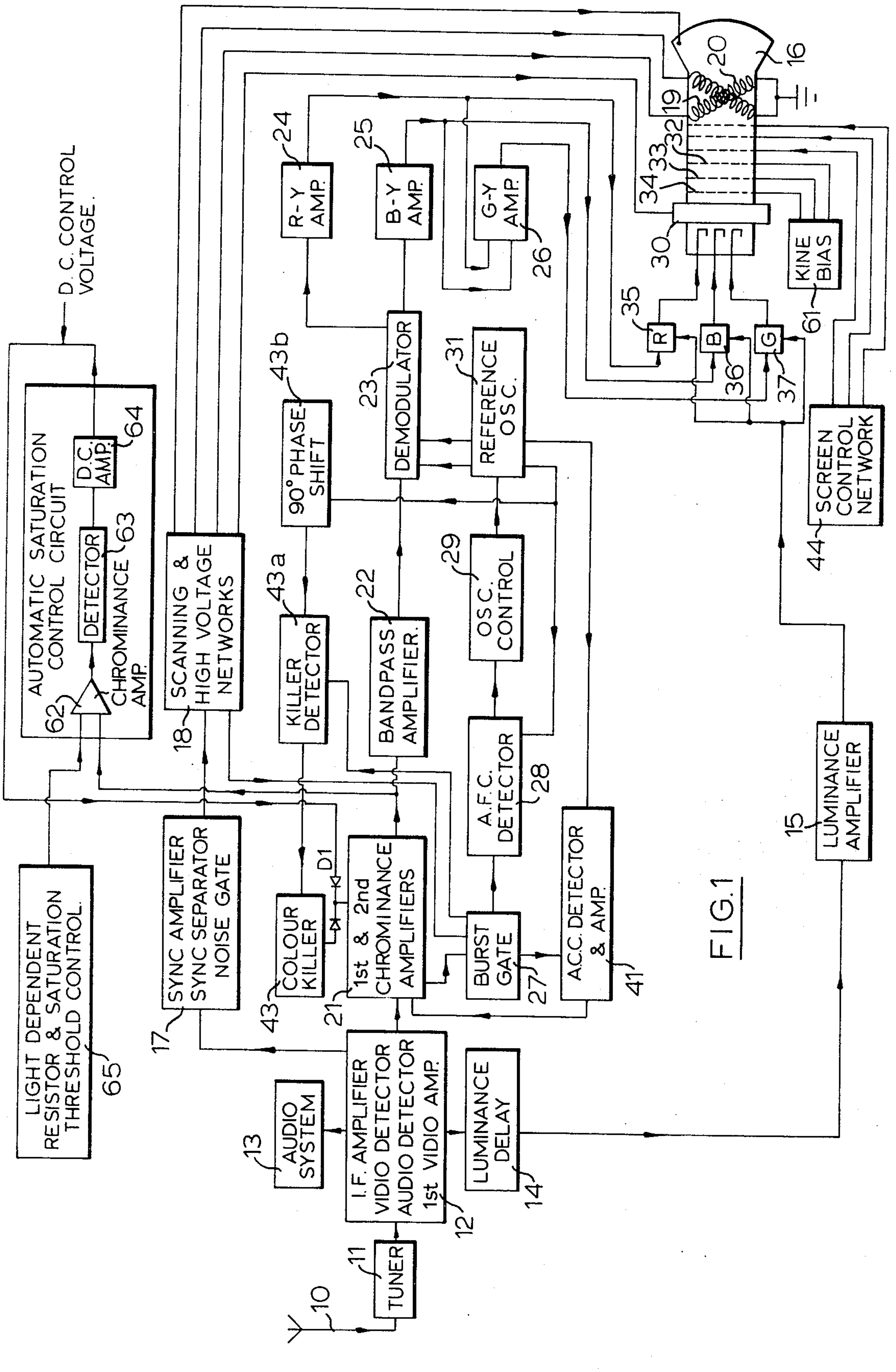
FIG. 1 is a block diagram of a typical colour television receiver modified in accordance with this invention.

Those skilled in the art will appreciate that the colour television receiver shown in FIG. 1 employs conventional components for the most part, so that only a brief description will be given herein of the conventional componets of the receiver of FIG. 1 and there mode of operation. With reference to FIG. 1, an antenna 10 is connected to the input circuit of a tuner 11 that comprises one or more radio frequency (R.F.) amplification stages and a first detector. The signal to which the tuner is tuned is amplified by the R.F. amplifier or amplifiers and detected, the detected signal then being applied to a block designated 12 containing one or more intermediate frequency (I.F.) amplifiers, a video detector, an audio detector and a first video amplifier. The detected signal from tuner 11 is amplified by the one or more I.F. amplifiers, the audio and video components of the signal detected, and the video signal amplified by the first video amplifier.

The luminance compoment (Y) of the video signal is delayed and then applied to the luminance amplifier 15 of the receiver. After amplification the luminance signal is applied to red (R), blue (B) and green (G) amplifiers 35, 36 and 37 respectively where matrixing with R-Y, B-Y and G-Y colour difference signals takes place resulting in red, blue and green (R, B, G) signals that are applied to the cathodes of the "red", "blue" and "green" electron guns respectively of colour picture tube 16.

The detected audio signal is supplied to a block 13 designated audio system and comprising a limiter, a discriminator, an audio frequency (A.F.) amplifier of one or more stages and a loudspeaker, the audio signal thereby being reproduced in a well known manner.

Synchronizing (sync) information is derived by one of the detectors in block 12 and applied to a block 17 consisting of a sync amplifier, sync separator and noise gate. The sync signal output from block 17 is applied to a block 18 containing the scanning and high voltage networks of the receiver. More specifically, block 18 comprises a horizontal scanning signal generator consisting of a line frequency oscillator, a phase detector and a frequency control stage for providing automatic control of the oscillator frequency; a vertical scanning signal generator, a horizontal convergence network, and a vertical convergence network. A horizontal scanning signal is developed and applied to the primary winding of an output transformer (not shown) having its secondary winding connected to the horizontol scanning coil 20 of the deflection yoke (not shown) of the receiver. A vertical scanning signal is developed and is coupled to the vertical scanning coil 19 of the deflection yoke of the receiver. Vertical and horizontal convergence signals also are developed and applied to a deflection yoke assembly shown schematically at 30. One high voltage D.C. voltage output line 38 of the high voltage network of block 18 also is connected to picture tube 16.

An automatic gain control system may be included within block 17 to develop an A.G.C. potential for application to tuner 11 and one of the I.F. amplification stages in block 12, as is well known.

The chrominance component of the video signal is amplified by first and second chrominance amplifiers 21, and a part of the signal then is applied to a band-pass amplifier 22, another part of the signal being applied to a colour burst amplifier or gate 27. Keying pulses from block 18 are applied to colour burst amplifier 27, and it applies its output to an automatic frequency control (A.F.C.) detector 28, an automatic chroma control (A.C.C.) detector and amplifier network 41 and a killer detector 43*a*. A.F.C. detector 28 provides a control signal that is applied to an oscillator control device 29 that controls the frequency of a colour or reference oscillator 31. The output signal of oscillator 31 is applied to A.C.C. detector 41, A.F.C. detector 28 and a colour demodulator 23 and also to killer detector 43*a* via a 90° phase shift network 43*b*. The output signal of band-pass amplifier 22 also is applied to demodulator 23, which may comprise a pair of synchronous demodulators for developing a red colour difference signal (R-Y) and a blue colour difference signal (B-Y). A green colour difference signal (G-Y) is obtained by matrixing the red and blue colour difference signals, and these three signals are amplified by colour difference amplifiers 24, 25 and 26 respectively and applied to R, B, G amplifiers 35, 36 and 37 respectively.

The operating frequency and phase of oscillator 31 corresponds to that of the colour burst signal (3.58 MHz), and the oscillator output signal and the signal from burst amplifier or gate 27 are compared in A.C.C. detector 41. A.C.C. detector 41 produces a signal indicative of reception of a colour signal and that varies in magnitude with the level of the received signal. This signal is supplied to the first chrominance amplifier in block 21 to vary the gain of this amplifier to compensate for variations in the level of the received signal. The output of a colour killer 43 is applied to the second chrominance amplifier in block 21 and determine whether this amplifier is biased on or off, colour killer 43 being connected to killer detector 43a. In the absence of a colour burst signal, killer 43 biases the second chrominance amplifier off.

The block 44 designates a conventional screen control network connected to the three screen electrodes of the three guns of colour picture tube 16.

Kine bias is provided from a source 61 to the three grid electtrodes 32-34 of the three guns of the picture tube.

In accordance with the instant invention there is provided an automatic saturation control system that consists of a chrominance amplifier 62, a detector 63, a D.C. amplifier 64 and a saturation threshold control circuit 65 including a device such as a light dependent resistor that changes a characteristic thereof in response to incident radiation. Amplifier 62, detector 63 and D.C. amplifier 64 constitute an A.G.C. system for the chrominance signal. A part of the chrominance signal at the output of the second chrominance amplifier is amplified by chrominance amplifier 62 and detected by detector 63. The resultant D.C. signal is amplified by D.C. amplifier 64 and applied to the second chrominance amplifier via a diode D1 to vary the gain of that amplifier in response to changes in level of the D.C. signal to maintain saturation level essentially constant. The saturation threshold control circuit also is connected to chrominance amplifier 62 and varies the threshold thereof to control the level of saturation that is maintained constant by the A.G.C. system.

Figure 2:
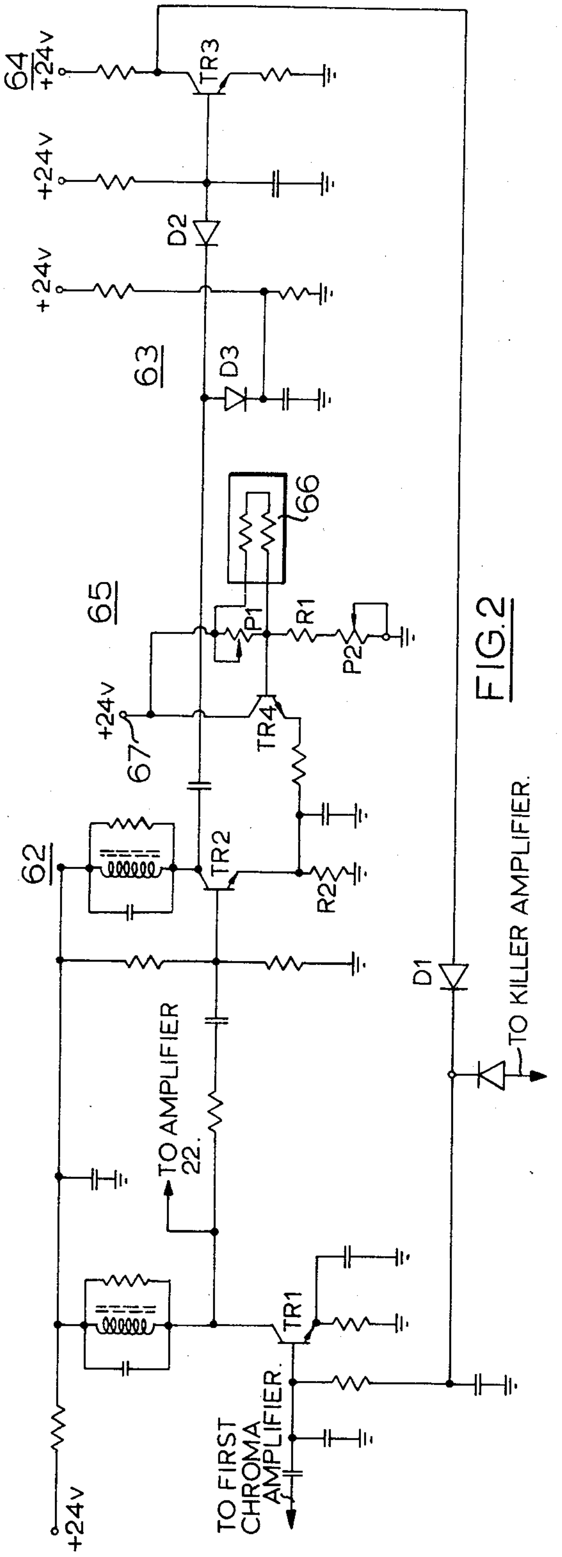
FIG. 2 is a schematic of an automatic saturation control system embodying this invention.

Referring to FIG. 2, the second chrominance amplifier includes a transistor TR1, while chrominance amplifier 62 includes a transistor TR2. Detector 63 is constituted by diodes D2 and D3, while D.C. amplifier 64 includes a transistor TR3. As aforementioned, the chrominance signal amplifier by transistor TR1 is further amplified by transistor TR2 and quasi-peak detected by diodes D2 and D3. The resulting D.C. signal that varies in accordance with chrominance signal level has its level shifted by transistor TR3 and is D.C. amplified by transistor TR3. The D.C. output signal of D.C. amplifier 64 is supplied via blocking diode D1 to the base of transistor TR1 to maintain an essentially constant saturation level.

The threshold level of transistor TR2 determines the amplitude at the collector electrode of transistor TR1 that must be present in order to overcome the reverse base-emitter bias of transistor TR2 to close the control loop. The threshold level of transistor TR2 is determined by the saturation threshold control circuit 65 that includes a light dependent resistor 66, a transistor TR4, potentiometers P1 and P2 and a resistor R1. As may be seen from FIG. 2, the potentiometer P1, resistor R1 and potentiometer P2 are connected in series circuit in the order named between a terminal at ground potential and a terminal at a suitable positive D.C. potential, say +24 volts, this latter terminal being designated 67. Light dependent resistor 66 is connected in parallel with potentiometer P1 which serves as a sensitivity control for the light dependent resistor. Potentiometer P2 is a manual saturation control. The common terminal of potentiometer P1 and resistor R1 is connected to the base electrode of transistor TR4, while the collector electrode of transistor TR4 is connected to terminal 67. The emitter electrode of transistor TR4 is connected to the common terminal of the emitter resistor of transistor TR2 and the emitter electrode thereof.

Light dependent resistor 66 may be mounted on the front of the receiver to sense changes in the ambient light incident upon the screen of picture tube 16. Any change in the ambient light level will change the response of light dependent resistor 66 and hence the bias on transistor TR4, since L.D.R. 66 is in parallel with bias determining potentiometer P1. Changes in the bias of transistor TR4 will affect its conductivity which in turn will change the response in the emitter circuit of transistor TR2 and hence the magnitude of reverse bias on the base-emitter junction of transistor TR2. In this manner, the threshold level of transistor TR2 will be varied dependent upon the degree of incident light so that for increases in incident light the threshold level will be increased while for decreases in incident light the threshold level will be decreased.

Rather than sensing ambient light, or in addition to sensing ambient light, L.D.R. 66 may be mounted so as to sense the average light output of the screen of picture tube 16 so as to vary saturation automatically in response to changes in the brightness of the light emitted from the picture tube screen.

Figure 3:
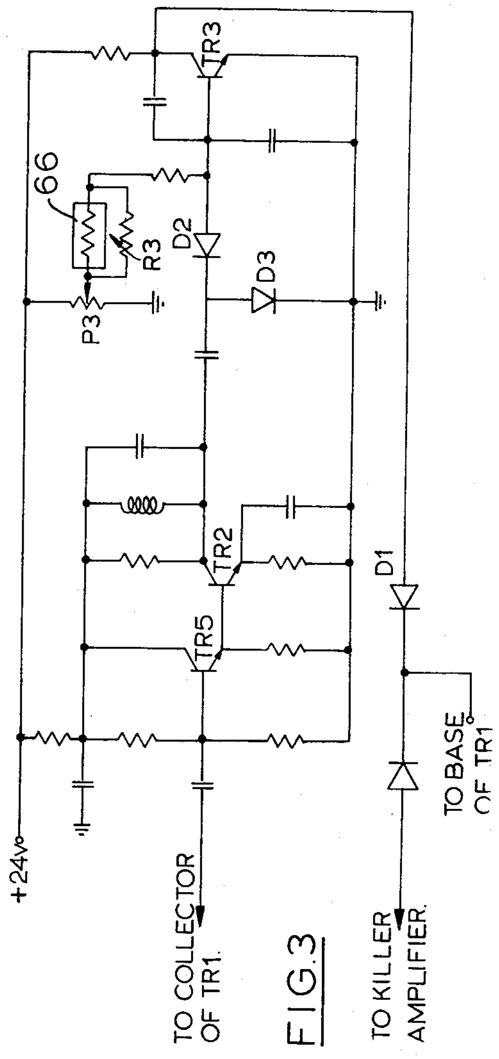
FIG. 3 is a schematic of a part of an automatic saturation control system constituting another embodiment of this invention.

The embodiment of the invention shown in FIG. 3 is similar to that of FIG. 2 except that a buffer stage constituted by a transistor TR5 is included and saturation threshold control is effected at the base electrode of transistor TR3 rather than in the emitter circuit of transistor TR2. In FIG. 3 potentiometer P3 is a manual saturation control corresponding to potentiometer P2 of FIG. 2. Light dependent resistor 66 is connected between the slider of potentiometer P3 and the base of transistor TR3. Resistor R3 connected across the light dependent resistor control its sensitivity. The resistance of the light dependent resistor decreases with increasing light to increase the degree of saturation.

It should be appreciated that other radiation-sensitive electrical devices, such as, for example, a photo transistor, could be used in place of L.D.R. 66. A radiation-sensitive device, as the term is used herein, is a device having an electrical characteristic, e.g., resistance, that varies with the magnitude, e.g., the presence and absence of incident radiation, e.g., light. A light dependent resistor is one having a resistance that varies dependent upon the intensity of light incident thereon.

While preferred embodiments of the invention have been described herein, those skilled in the art will appreciate that changes and modifications may be made therein without departing from the spirit and scope of the invention as defined in the appended claims.

We claim: What we claim as our invention is:

1. A colour television receiver having a picture tube with a screen; a chrominance signal channel for translating a chrominance signal received by said receiver, said chrominance signal channel including chrominance signal amplifying means having an output terminal and chrominance signal demodulating means; an automatic saturation control system, said automatic saturation control system comprising an A.G.C. system including detecting means for detecting a part of the chrominance signal translated by said chrominance signal channel prior to demodulation thereof to provide a D.C. signal that varies in magnitude responsive to changes in the level of the chrominance signal, means for applying said D.C. signal to said chrominance signal amplifying means to maintain the level of the chrominance signal at said output terminal of said chrominance signal amplifying means substantially constant, a saturation threshold control circuit comprising a radiation-sensitive device, and means connecting said device in circuit with said A.G.C. system to vary the level of the chrominance signal regulated by said A.G.C. system in response to changes in radiation incident on said device and to which said device is sensitive to increase said level in response to an increase in radiation and to decrease said level in response to a decrease in radiation.

2. A colour television receiver according to claim 1 wherein said radiation-sensitive device is mounted to sense ambient light incident on said screen of said picture tube.

3. A colour television receiver according to claim 1 wherein said radiation-sensitive device is mounted to sense light emitted from said screen of said picture tube.

4. A colour television receiver according to claim 1 wherein said radiation-sensitive device is mounted to sense ambient light incident on said screen of said picture tube and also to sense light emitted from said screen of said picture tube.

5. A colour television receiver according to claim 1 wherein said radiation sensitive device is a light dependent resistor.

6. A colour television receiver according to claim 1 wherein said A.G.C. system includes a first amplifier for amplifying said part of said chrominance signal, said first amplifier having an output terminal, means connecting said output terminal of said first amplifier and said detecting means for applying the chrominance signal amplified by said first amplifier to said detecting means, a D.C. amplifier having an input terminal, and means connecting said detecting means and said input terminal of said D.C. amplifier for applying said D.C. signal to said D.C. amplifier.

7. A colour television receiver according to claim 6 wherein said first amplifier includes a transistor having base, emitter and collector electrodes, said means connecting said device in circuit with said A.G.C. system comprising means responsive to changes in radiation incident on said device for varying the bias between said base and emitter electrodes.

8. A color television receiver according to claim 7 wherein said means connecting said device in circuit with said A.G.C. system includes a second transistor having base, collector and emitter electrodes and means including said radiation-sensitive device for applying a bias between said base and emitter electrodes of said second transistor.

9. A colour television receiver according to claim 8 wherein said radiation-sensitive device is mounted to sense ambient light incident on said screen of said picture tube and is a light dependent resistor.

10. A colour television receiver according to claim 6 wherein said D.C. amplifier includes a transistor having base, emitter and collector electrodes, said means connecting said device in circuit with said A.G.C. system comprising means responsive to changes in radiation incident on said device for varying the bias between said base and emitter eleectrodes.

* * * * *